UNITED STATES PATENT OFFICE.

EUGÈNE G. RESSENCOURT, OF ST. LOUIS, MISSOURI; HARRY TROLL, OF ST. LOUIS, MISSOURI, ADMINISTRATOR OF SAID RESSENCOURT, DECEASED, ASSIGNOR TO F. B. CHAMBERLAIN COMPANY, OF ST. LOUIS, MISSOURI, A CORPORATION OF ILLINOIS.

CHERRY EXTRACT AND PROCESS OF MAKING SAME.

1,036,338.     Specification of Letters Patent.     Patented Aug. 20, 1912.

No Drawing.     Application filed September 25, 1911. Serial No. 651,055.

*To all whom it may concern:*

Be it known that I, EUGÈNE G. RESSENCOURT, a citizen of the United States, residing at the city of St. Louis, Missouri, have invented a certain new and useful Cherry Extract and Processes of Making Same, of which the following is such a full, clear, and exact description as will enable any one skilled in the art to which it appertains to practise said process.

My invention relates to a process of making cherry flavoring extract, and its object is to produce an extract that will be highly concentrated and will have a flavor and aroma corresponding to the fresh fruit.

In my process, I prefer to separate the seeds and skins from the pulp and then press out the greater part of the juice. The next step is to crush the pulp from which the juice has been removed, with an approximately equal quantity of high grade crystallized sugar and to this mixture add cologne spirit, which I have found to be the most suitable solvent of the aromatic substance which I desire to extract. I prefer to use the sugar in the form of crystals for the reason that the principal purpose of the sugar is to assist in crushing and separating the parts of the fruit, and the crystals as they are being broken up satisfactorily perform this function. The fact that the sugar ultimately dissolves and that its presence really adds to the commercial value of the extract, makes it a particularly valuable means for the purpose mentioned. I wish it to be understood, however, that the use of sugar in any form, while desirable, is not absolutely essential to the production of satisfactory extract, nor is it essential that the proportions as set forth be used, that amount merely having been found to be preferable. The mixture is allowed to stand a few days and is then subjected to distilling action by means of which the aromatic substances are separated from the fruit and carried over with the cologne spirit to a condenser. In beginning the extraction the mixture should be heated very gradually, and a suitable temperature to be maintained during the process of extraction is from 170° F. to 200° F. Care must be taken that none of the fruit is burned, since this would impair the quality of the extract, and to prevent this I usually place the crushed fruit in a perforated strainer within the retort. This prevents the fruit from coming into contact with the sides and bottom of the vessel. The distilling action is continued until the volume of the mixture is reduced to about one-half of its original volume. The residue which contains the sugar, coloring matter of the fruit, and some undistilled spirit, is then strained, preferably through a double linen cloth, and after cooling is added to the distillate. The result is a highly concentrated cherry extract which corresponds to the fruit in color, flavor and aroma. I have found, however, that it adds to the quality of the extract, as well as to the delicacy and permanency of its aroma and its exact correspondence to the fruit, to add bitter almond oil, which is preferably done at the time the fruit is mixed with the cologne spirit. I prefer to use almond oil from which all of the prussic acid has been removed.

I will now give a particular example of the details of my process; first, I remove the skins and seeds from about 6 gallons of unwashed cherries, and then press the pulp to remove the greater part of the juice with the result that between 3 and 4 gallons of pulp will be left. This pulp is mixed with an equal quantity, by weight, or about 32 pounds, of rock candy, which should preferably be broken into coarse pieces and the mixture is ground in a mortar under strong pressure until all of the rock candy is dissolved. I then add about one-half the quantity by volume, or about 3 gallons, of cologne spirit, and about 60 grains per gallon of mixture, or about 540 grains, of oil of bitter almonds, and allow the whole to stand for several days, after which it is subjected to distilling action, the distillation being carried on at a temperature of from 170° to 200° F. until the volume of the mixture has been reduced to about one-half. The residue is then strained and the liquid portion thereof mixed with the distillate.

While the process just described produces a satisfactory extract, I prefer, in practice, to also make use of the skins and seeds of the fruit in the manner which I will now set forth, for the purpose of giving the extract more perfect characteristic color of the fruit and adding to the quantity, quality and permanence of its aromatic content.

I cut the skins of the cherries into small pieces and grind them up with an equal quantity of rock candy and then add about twice the quantity by volume of cologne spirit. This mixture is allowed to stand two weeks or longer, when it may be strained and the liquid added to the distillate previously described. I prefer, however, to add the mixture without straining to the mixture containing the pulp and distil the whole together. I find that by employing the skins of the cherries in the manner described, the color of the resulting extract is improved. I also immerse the seeds in cologne spirit, using about two gallons of the spirit to one gallon of the seeds, for example. After being allowed to stand about a month, the liquid is strained off and, as in the case of the liquid resulting from treating the skins, may be directly added to the distillate, but I prefer to also add it to the pulp mixture before distillation. In any case, the quantity of cologne spirit contained in the quantity of mixture distilled should be about half as great as the quantity of the other ingredients taken together.

It should be understood that the mixture of any part of the fruit with cologne spirit may be allowed to stand longer than the length of time mentioned, if desired.

I claim:

1. The process of making cherry extract which comprises mixing the fruit with cologne spirit and almond oil, and subjecting the mixture to distilling action substantially as described.

2. The process of making cherry extract which comprises crushing a mixture of sugar and cherry pulp, adding cologne spirit and oil of bitter almonds, and subjecting the mixture to distilling action.

3. The process of making cherry extract which comprises crushing a mixture of sugar and cherry pulp, adding cologne spirit and oil of bitter almonds, subjecting the mixture to distilling action until the volume is reduced about one-half, straining the residue and adding it to the distillate.

4. The process of making cherry extract which comprises crushing a mixture of sugar and cherry pulp, adding cologne spirit, oil of bitter almonds, and the liquid resulting from treating cherry skins with cologne spirit, subjecting the whole to distilling action until the volume is reduced about one-half, straining the residue and adding it to the distillate.

5. The process of making cherry extract which comprises mixing the fruit with a solvent of the aromatic substances of cherries and almond oil, and subjecting the mixture to distilling action.

6. The process of making cherry extract which comprises removing the skins and seeds from unwashed cherries, crushing the fruit with an approximately equal quantity by weight of rock candy, adding cologne spirit and oil of bitter almonds, subjecting the mixture to distilling action at a temperature of about 180° F. until the volume is reduced one-half, straining the residue, and mixing it with the distillate.

7. The process of making cherry extract which comprises removing the skins and seeds from unwashed cherries, crushing the pulp with an approximately equal quantity by weight of rock candy, adding cologne spirit, oil of bitter almonds and the liquid resulting from treating the seeds with cologne spirit, subjecting the mixture to distilling action until the volume is reduced one-half, straining the residue, and mixing it with the distillate.

8. The herein described product comprising oil of almonds and the distillate of a mixture of cherries with a solvent of the aromatic substances thereof.

9. A flavoring compound comprising oil of almonds, the distillate of a mixture of cherries with cologne spirit, and the liquid portion of the undistilled residue.

10. A flavoring compound comprising coloring matter derived from cherry skins, oil of almonds, and the distillate of a mixture of cherries with cologne spirit.

11. A flavoring compound comprising oil of almonds and essential oils derived from cherries.

In testimony whereof, I have hereunto set my hand and affixed my seal in the presence of the two subscribing witnesses.

EUGÈNE G. RESSENCOURT. [L. S.]

Witnesses:
W. A. ALEXANDER,
B. L. CROWLEY.